Sept. 9, 1958 D. T. TORELL ET AL 2,850,860
ONE-PIECE LAMB COAT
Filed May 27, 1955
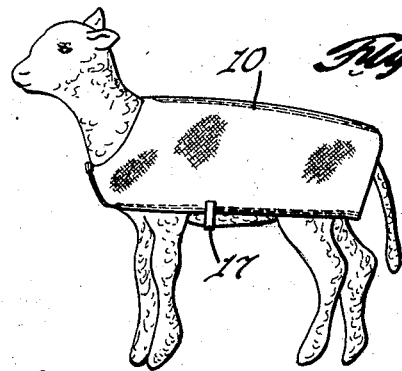
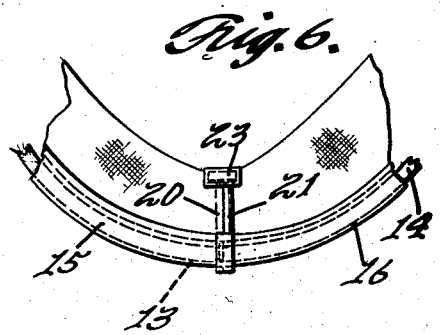
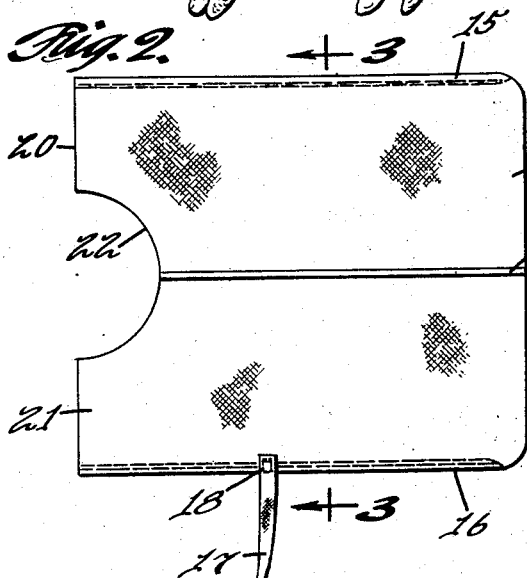
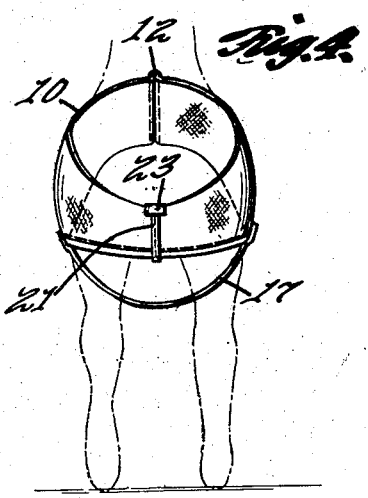
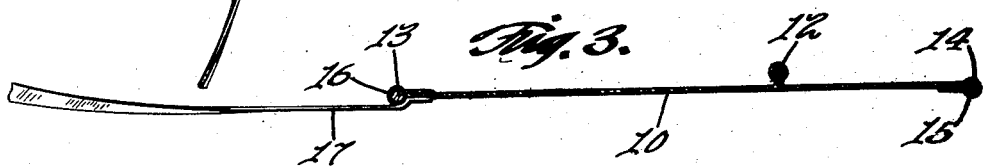
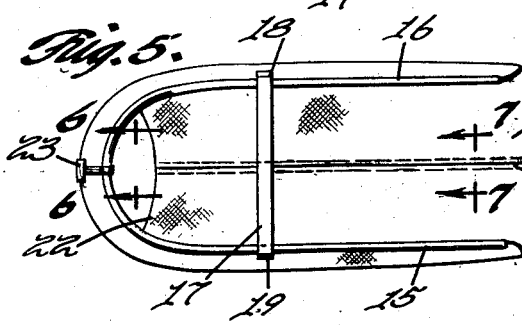
INVENTORS
Donald T. Torell
& Rosemary M. Torell
BY Victor J. Evans & Co.
ATTORNEYS

United States Patent Office 2,850,860
Patented Sept. 9, 1958

2,850,860

ONE-PIECE LAMB COAT

Donald T. Torell and Rosemary M. Torell, Hopland, Calif.

Application May 27, 1955, Serial No. 511,628

1 Claim. (Cl. 54—79)

This invention relates to protecting garments for animals, such as the dog blanket type, in which a sheet of material is retained by chest or belly straps over the body of an animal, and in particular, a one-piece coat for lambs and the like including a sheet of material with longitudinally disposed reinforcing elements in the center and side edges thereof and with an elastic strap connected to the sides and positioned behind the front legs of the animal.

The lamb coat of this application is an improvement over the copending application of Donald T. Torell, one of the above-named applicants, filed November 24, 1953, with Serial No. 393,984, in that the coat is formed of one continuous piece of material with parts reinforced with cords positioned in hems or tunnels and with the T-strap of the former application replaced with an elastic strap which provides greater freedom of movement of the forelegs of the animal.

The purpose of this invention is to provide an improved protecting coat for small lambs in which the coat is adapted to be readily positioned on the animal and in which all mechanical fastening devices are eliminated.

With the conventional type of lamb coat, the fastening elements and straps annoy the animal and, particularly with comparatively small lambs, the coat is more of a nuisance than a help. With this thought in mind, this invention contemplates a comparatively simple protecting coat which permits freedom of the forelegs of an animal and which may readily be positioned on and removed from the animal.

The object of this invention is, therefore, to provide means for forming a protecting coat that is particularly adapted for small lambs.

Another object of the invention is to provide an improved coat for lambs and the like in which the coat is retained in position without mechanical fastening elements.

A further object of the invention is to provide an improved coat for lambs and the like in which the coat is of a simple and economical construction.

With these and other objects and advantages in view, the invention embodies a substantially rectangular shaped piece of material having a neck receiving opening in the center of the forward end, with cords in hems or tunnels extended longitudinally through the center and on the side edges of the sheet of material and with a single strap, the ends of which are secured to the sides of the sheet of material, positioned below the body of the animal, and behind the front legs.

Other features and advantages of the invention will appear from the following description taken in connection with the drawing, wherein:

Figure 1 is a side elevational view illustrating the improved lamb coat as it appears in use and showing the coat positioned on a lamb.

Figure 2 is a plan view showing a sheet of material, or blank, from which the coat is formed with the strap extended at one side.

Figure 3 is a cross section through the improved lamb coat with the parts shown on an enlarged scale, said section being taken on line 3—3 of Figure 2.

Figure 4 is a front elevational view showing the improved lamb coat with the parts assembled and showing the coat positioned on a lamb, the legs and a portion of the neck of the lamb being shown in broken lines and the head being omitted.

Figure 5 is a view looking upwardly toward the under surface of the lamb coat with the parts as shown in Figure 4.

Figure 6 is a view taken on line 6—6 of Figure 5 illustrating the connections of the parts at the forward end of the lamb coat, the parts being shown on an enlarged scale and parts thereof being broken away.

Figure 7 is a cross section taken on line 7—7 of Figure 5 showing the cord positioned in the hem or tunnel at the center of the back of the lamb coat.

Referring now to the drawing, wherein like reference characters denote corresponding parts, the improved lamb coat of this invention includes a sheet of material 10 having a cord 11 in a tunnel 12 extended longitudinally through the center with cords 13 and 14 in similar tunnels 15 and 16, respectively, at the sides and with an elastic strap 17 connecting the side edges, or tunnels 15 and 16. The ends of the strap 17 are secured by a suitable adhesive or stitches to the sides as shown at the points 18 and 19 and overlapping ends 20 and 21 of the sides are secured by a suitable adhesive at the front of the garment or sheet of material.

The forward end of the sheet of material is provided with a substantially semi-circular recess 22 from the sides of which the ends 20 and 21 extend, and as illustrated in Figures 4 and 5, the ends 20 and 21 are secured together by stitching, electronic welding, or other suitable means. Also as shown in Figure 6 the upper edges of the ends 20 and 21 are retained in overlapped relation with a strip of adhesive tape 23.

As illustrated in Figure 5, the ends of the strap 17 are connected by stitching, a suitable adhesive, or by being electronically welded or by other means. It will also be understood that the tunnels or hems 15 and 16 may be electronically welded or formed by other suitable means.

With the garment formed as disclosed and described, a lamb coat is provided that is substantially anchored so that it will remain in position to keep the lamb dry and so that the natural body heat is utilized making artificial or outside heat unnecessary. The lamb coat is particularly adapted to protect the lamb from the elements, such as cold and wet weather.

Although the reinforcing tunnels or hems into which cords or other reinforcing elements may be positioned are illustrated as being parallel and longitudinally disposed, it will be understood that these may be extended in other suitable positions, and although a straight strap is illustrated, a strap of any suitable pattern may be extended across the chest connecting the sides of the lamb coat behind the forelegs of the animal. It will also be understood that the rear portion of the garment may be provided with an opening through which the tail of the animal may be threaded to locate the rear portion of the garment or a tab may be extended from the rear and positioned to extend back over the tail to retain the coat or garment in position.

Other means may be provided for connecting the rear portion of the garment to the tail so that when the tail drops off, which is in about ten days, the coat will be automatically released.

It will be understood that other modifications, within the scope of the appended claim, may be made in the design and arrangement of the parts without departing from the spirit of the invention.

What is claimed is:

A lamb coat comprising a substantially rectangular shaped sheet of material having longitudinally disposed tunnels in the side edges and between the sides and having a neck receiving recess in the forward end, portions of the forward end at the ends of the recess being secured together, an elastic strap adapted to be positioned behind the forelegs and across the chest of an animal, and positioned with the ends secured to the sides of the sheet of material, and cords positioned in said tunnels.

References Cited in the file of this patent

UNITED STATES PATENTS

| | | |
|---|---|---|
| 177,809 | Crittenden | May 23, 1876 |
| 340,332 | Lewis | Apr. 20, 1886 |
| 448,376 | Sisson | Mar. 17, 1891 |
| 502,508 | Cleveland et al. | Aug. 1, 1893 |
| 583,823 | Smith | June 1, 1897 |
| 1,218,004 | Sayles | Mar. 6, 1917 |

FOREIGN PATENTS

| | | |
|---|---|---|
| 100,564 | Australia | Apr. 8, 1937 |